Figure 1:
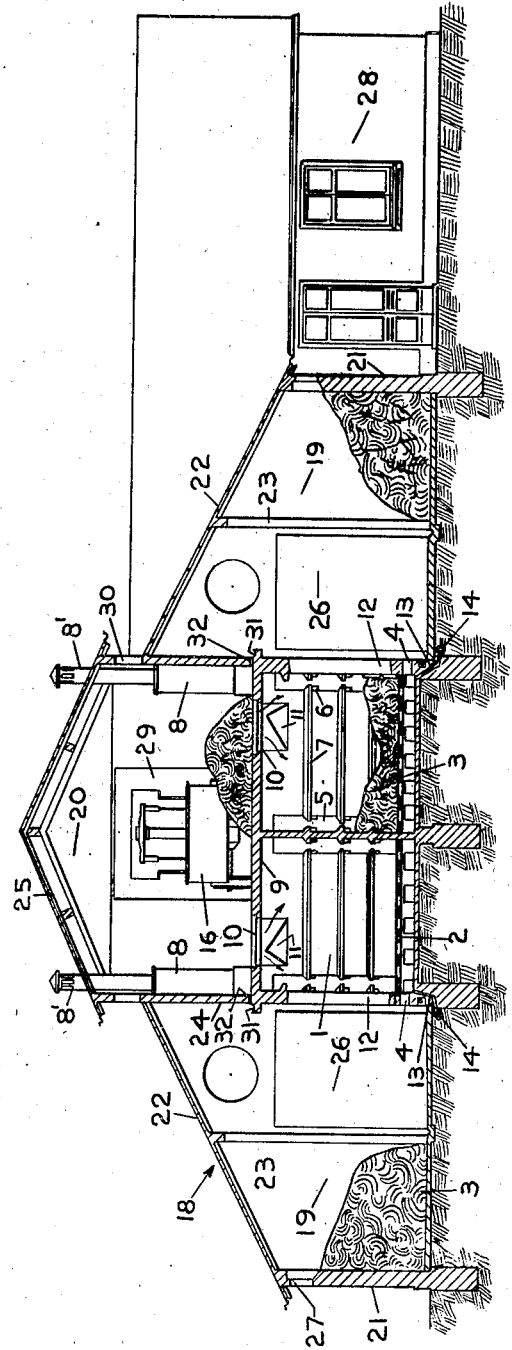

Aug. 31, 1926.

E. P. COOKE 1,597,725

PROCESS AND APPARATUS FOR TRANSFORMING ORGANIC MATTER

Filed June 13, 1923   2 Sheets-Sheet 1

INVENTOR.
Edward Payson Cooke
BY
ATTORNEYS.

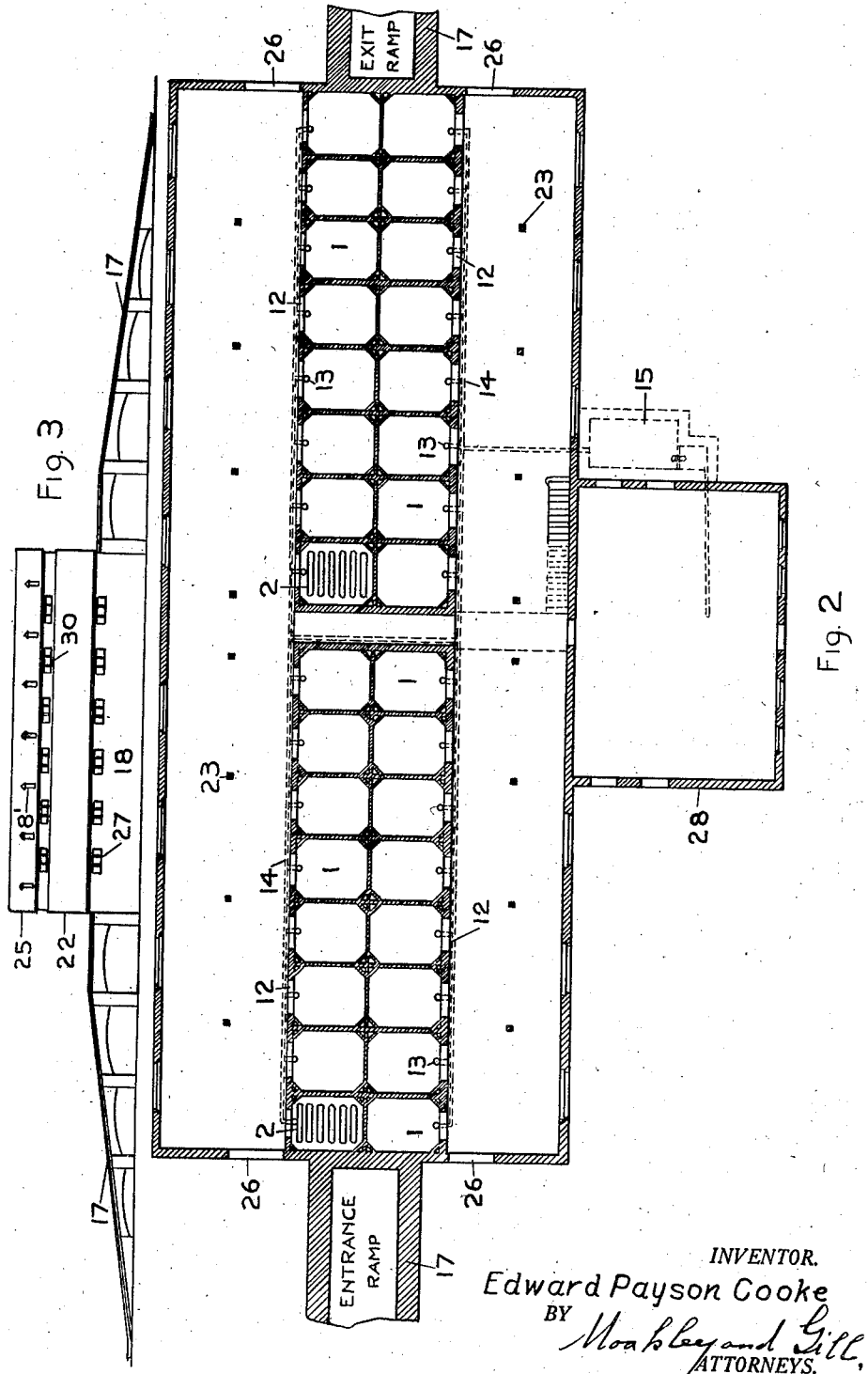

Patented Aug. 31, 1926.

1,597,725

UNITED STATES PATENT OFFICE.

EDWARD PAYSON COOKE, OF PATERSON, NEW JERSEY, ASSIGNOR TO AMERICAN BECCARI CORPORATION, OF NEW YORK, N. Y., A CORPORATION OF NEW YORK.

PROCESS AND APPARATUS FOR TRANSFORMING ORGANIC MATTER.

Application filed June 13, 1923. Serial No. 645,058.

This invention relates to the transformation of organic matter by a fermentation process into a form in which its nitrogen is readily available for agriculture. The invention is particularly adapted for use in disposing of waste organic matter, such as garbage and other organic refuse, as the resultant product is odorless and not infectious, but the nitrogenous constituents of the original matter are conserved in the product so that it may be used as an organic fertilizer.

An invention of this general character forms the subject matter of Reissue Patent No. 15,417, granted to Giuseppe Beccari on July 25, 1922. This patent shows a structure consisting of a number of chambers within which material is placed and allowed to remain for a sufficient time to be converted into a harmless, odorless mass by the action of the micro-organisms of fermentation. The air required for the bacterial actions which occur within the chambers is obtained by natural upward circulation around and through the material, the air entering the chambers through ports below the material and the gaseous products of fermentation passing from the chambers over suitable substances for absorbing their offensive constituents. The process may thus be carried out without contaminating the surrounding air, which is of particular advantage as it permits the apparatus to be used in communities where other methods of garbage and organic refuse disposal cannot well be employed.

During the early stages of fermentation there is a rapid rise of the temperature of the mass of material due to the increase of the micro-organisms of fermentation contained therein, but in using the apparatus in cold weather it has been found that portions of the mass lying next to the outside walls of the chambers are retarded in their fermentation by the low external temperature to which these walls are exposed and while fermentation may be eventually completed, the length of time required is prolonged beyond that which would be required if the apparatus were located in a warmer climate.

It is a general object of the invention to provide a process and apparatus for accelerating the fermentation of organic matter, particularly in cold weather, and for obtaining other advantages in the practical operation of fermentation apparatus of this character.

In accordance with the invention the chambers within which fermentation takes place are enclosed on their top and sides by a heat-retaining structure which shields the chambers from the action of wind and permits their outside walls and the portions of the fermenting matter lying next to them to be maintained in a warm condition. The structure is also adapted to serve as a storage space for the completely fermented matter after it has been removed from the chambers, at which time it has a considerable temperature which is thus utilized in addition to the warmth of the chambers for warming the air within the structure. At the same time the mass removed from the chambers is also kept in a warm condition so as to permit the development of the complementary micro-flora favorable to agriculture and which do not thrive under the conditions of high temperature prevailing in the chamber during the fermentation operation.

The air supplied to the chambers to maintain and propagate the micro-organisms peculiar to fermentation is taken from the warm interior of the structure instead of from the cold external atmosphere and by being thus preheated it is in better condition to accelerate fermentation within the chambers.

By providing an enclosure over the top of the chambers several practical advantages are obtained in the operation of the apparatus during both hot and cold weather, since in summer the doorways and windows of the enclosure may be closed by screens to keep in flies and other insects which may be present in the organic matter supplied to the chambers, so that they may be killed by the use of a suitable insecticide which may also act as an odor-repellent. The enclosure also permits the unloading of the vehicles containing the organic matter without subjecting the matter to the action of rain or snow which would cause an excess of moisture to be admitted to the chambers. If the matter to be supplied to the chambers initially contains an excessive amount of moisture it may be placed on the roof of the chambers for a sufficient length of time to permit the moisture to drain out of it without any danger that it may become further moistened by rain or snow. The enclosure also provides a space in which during the winter frozen garbage or other refuse material may be spread out on the roof of the chambers and allowed to thaw out sufficiently to permit the excessive moisture to be drained away before the material is placed in the chambers, this thawing-out being caused by the warmth of the roof due to the fermentation taking place in the chambers below. The enclosure also provides a space within which the vehicles used for transporting the matter to the chambers may be washed out and the solid organic matter washed from the vehicles may be left on the roof of the chambers until the water has drained therefrom, after which it can be put into the chambers, the water used in washing being allowed to drain into the sewer or some other suitable place.

The particular nature of the invention as well as other objects and advantages thereof will appear more clearly from a description of a preferred embodiment as shown in the accompanying drawings in which Fig. 1 is an elevation principally in section of a series of fermentation chambers with the invention applied thereto.

Fig. 2 is a plan of the apparatus in section just below the roof of the chambers and Fig. 3 is an external view of the apparatus.

The apparatus consists of a number of adjacent fermentation chambers 1, which are shown of the general type disclosed in the Beccari patent referred to above. Each chamber is provided near its bottom with a grating 2 upon which the material 3 to be fermented rests. Air is supplied to the chambers below the gratings through apertures 4 in the bottom of the side walls of the chambers. At each corner of each chamber there is a conduit 5 communicating with the space below the grating and provided with openings 6 beneath horizontal baffles 7 which deflect the material as it falls into the chamber, to leave vacant spaces below the baffles through which air may circulate from the conduits 5 to more effectively cause the development of the micro-organisms of fermentation within the mass, as fully explained in the said patent.

Each chamber is provided at its top with an absorption apparatus 8 for taking out of the gaseous products of fermentation the offensive constituents in order that the gas ultimately discharged from the chamber through the vent 8' may be odorless and non-infectious.

The roof 9 of the chambers is provided above each chamber with a charging doorway 10 below which is suspended a conical deflector 11 for distributing the material more uniformly through the chamber as it is fed into the same. Each chamber has in its outer wall a doorway 12 through which the solid products of fermentation may be removed, it being understood that each of these doorways is provided with a suitable closure which has been omitted from the drawings for the sake of simplicity.

During the process of fermentation liquids of different compositions containing some of the micro-organisms peculiar to fermentation drain from the mass, and to collect these liquids in order that the micro-organisms which they contain may be conserved for re-introduction into the fermenting mass or for accelerating an initial fermentation in a freshly filled chamber, a conduit 13 leads from the bottom of each chamber into a common conduit 14 which discharges into a sump 15, Fig. 2, from which the liquids may be removed from time to time.

In order to permit the vehicles 16 which are used for conveying the material to the apparatus to be driven over the roof 9 of the chambers ramps 17 are provided at each end of the series of chambers as shown most clearly in Figs. 2 and 3. The charging doorways 10 of each transverse pair of chambers are placed sufficiently far apart to permit the vehicles to pass between them as shown in Fig. 1.

The fermentation chambers are placed within a building 18 consisting of portions 19 on the sides of the chambers and a portion 20 above the chambers. The side enclosures 19 of the building consist of walls 21 and sloping roofs 22 supported upon the walls 21, columns 23 and the side walls 24 of the top enclosure 20 which is provided with a roof 25. The outer portions of the side enclosures 19 serve as storage spaces for the completely fermented material 3' removed from the chambers. To permit this material to be conveniently loaded upon vehicles to be carried away the ends of each side enclosure are provided with doorways 26 through which vehicles may enter and leave. These enclosures may also be provided with suitable windows 27. An extension 28 may also be provided to furnish quarters for the attendants, storage space, tool rooms and the like.

The upper enclosure 20 is provided at its ends with doorways 29 in line with the ramps 17 through which vehicles may enter and leave this enclosure to bring material to the apparatus. The upper enclosure may also be provided with windows 30, and the vents 8' extend through the roof 25 into the external atmosphere. The sides of the roof of the chambers are provided with gutters 31 into which liquid draining from the material deposited upon the roof may flow through ports 32 in the side walls 24. The roof may be anticlinal to permit natural drainage toward the gutters or the liquids may be swept into the gutters in case a flat roof is preferred. The gutters may discharge into a sewer or other suitable waste receiver.

In the operation of the apparatus described above the material to be supplied to the chambers for fermentation is conveyed to the tops of the chambers by the vehicle 16 and if it is not too moist to be placed in the chambers it is immediately dumped therein through the charging doorways 10, being distributed in the chambers by the deflector 11. After the chambers have been filled the charging doorways are tightly closed by suitable doors and the material is left in the chambers for a sufficient length of time to complete the fermentation operation caused by the micro-organisms which are maintained and propagated by the air which enters through the apertures 4 and passes through and around the mass of material. The gaseous products of fermentation are freed of their noxious constituents in the absorption chambers 8. The liquid products of fermentation drain through the grating 3 and flow through the conduits 13 and 14 into the sump 15. As the fermentation proceeds the temperature of the mass increases rapidly and the resulting warmth of the chambers warms the air within the side and top enclosures which in turn protect the chambers from low external temperatures and the cooling effect of the wind. The temperature of the air in the enclosures may be controlled by opening more or less of the windows 27 and 30 as well as the doors at the ends of the chambers. The warming of the air in the enclosures by the heat radiated from the walls of the chambers is also of advantage as this air enters the chambers at a higher temperature and is therefore better adapted for maintaining and propagating the micro-organisms of fermentation.

After the fermentation of the material is complete, it is removed from the chambers through the discharge doorways 12 and stored in the outer parts of the side enclosures, as at 3', until it is desired to remove it for use as a fertilizer. When removed from the chambers the material is warm and by storing it within the enclosures this heat is available for warming the air within the enclosures and for causing the development of the complementary micro-flora favorable to agriculture.

If the material unloaded from the vehicle 16 is in too moist a condition for immediate supply to the chambers it may be placed upon gratings on the top of the chambers until the moisture is drained therefrom, this moisture flowing through the ports 32 to the gutters 31 from which it flows into a sewer or other suitable place. As the material is protected during the drying operation there is no danger that it will be again moistened by rain or snow. In cold weather when the material may be frozen it can be thawed out by the heat from the chambers without exposure to the weather. After the material has been sufficiently dried it is introduced into the chambers as described above.

By providing screens for the doorways 26 and 29 and windows 27 and 30 flies and other insects which may be brought in with the loads of material are confined within the building and thus prevented from infesting the neighborhood. They may be exterminated by using a suitable insecticide, which is also an advantage in lessening or preventing odors within the building.

While a preferred embodiment of the invention has been shown and described, it will be understood that it may be employed in other forms and that various changes in details of construction may be made without departing from the principle of the invention as defined in the appended claims.

I claim:—

1. A fermentation process for transforming organic matter into a form in which its nitrogen is available, which consists in confining the matter within a chamber, supplying air to the chamber to permeate the matter and maintain and propagate the micro-organisms peculiar to fermentation and preheating the air supplied to the chamber by the heat of fermentation.

2. A fermentation process for transforming organic matter into a form in which its nitrogen is available, which consists in confining the matter within a chamber, supplying air to the chamber to permeate the matter and maintain and propagate the micro-organisms peculiar to fermentation and preheating the air supplied to the chamber by the heat of the completely fermented matter after it has been removed from the chamber.

3. A fermentation process for transforming organic matter into a form in which its nitrogen is available, which consists in confining the matter within a chamber, supplying air to the chamber to permeate the matter and maintain and propagate the micro-organisms peculiar to fermentation and preheating air supplied to the chamber by the heat produced by the fermentation within the chamber to raise the temperature of the air to promote fermentation.

4. A fermentation process for transforming organic matter into a form in which its nitrogen is available, which consists in confining the matter within a chamber, supplying air to the chamber to permeate the matter and maintain and propagate the micro-organisms peculiar to fermentation and subjecting the air supplied to the chamber to the heating effect of the completely fermented matter removed from the chamber to raise the temperature of the air to promote fermentation.

5. In apparatus for transforming organic matter into a form in which its nitrogen is available, the combination of a chamber for receiving the matter, means for supplying air to the chamber to maintain and propagate the micro-organisms peculiar to fermentation and means for preheating the air supplied to the chamber by the effect of the heat of fermentation.

6. In apparatus for transforming organic matter into a form in which its nitrogen is available, the combination of a chamber for receiving the matter, means for supplying air to the chamber to maintain and propagate the micro-organisms peculiar to fermentation and means for preheating the air supplied to the chamber by the heat of the completely fermented matter after it has been removed from the chamber.

7. In apparatus for transforming organic matter into a form in which its nitrogen is available, the combination of a chamber for receiving the matter, a supporting member for the matter spaced from the bottom of the chamber and provided with apertures, means for supplying air to the space below the member to permeate the matter and maintain and propagate the micro-organisms peculiar to fermentation and means for preheating the air supplied to the space below the member by the heat of fermentation.

8. In apparatus for transferring organic matter into a form in which its nitrogen is available, the combination of a chamber for receiving the matter, a supporting member for the matter spaced from the bottom of the chamber and provided wtih apertures, means for supplying air to the space below the member to permeate the matter and maintain and propagate the micro-organisms peculiar to fermentation and means for preheating the air supplied to the space below the member by the heat of the completely fermented matter after it has been removed from the chamber.

9. In apparatus for transforming organic matter by a fermentation process into a form in which its nitrogen is available, the combination of a chamber for receiving the matter and from which the matter is removed after fermentation has taken place, means for supplying air to the chamber to maintain and propagate the micro-organisms peculiar to fermentation and means associated with the chamber for receiving the fermented matter removed therefrom in order that its heat may be used for preheating the air supplied to the chamber.

10. In apparatus for transforming organic matter by a fermentation process into a form in which its nitrogen is available, the combination of a chamber for receiving the matter and from which the matter is removed after fermentation has taken place, means for supplying air to the chamber to maintain and propagate the micro-organisms peculiar to fermentation and means associated with the chamber for preheating the air supplied to the chamber by the heat produced by fermentation taking place within the chamber.

11. In apparatus for transforming organic matter into a form in which its nitrogen is available, the combination of an inner chamber for receiving the matter, an outer chamber surrounding the inner chamber and means for supplying air to the inner chamber from the outer chamber to maintain and propagate the micro-organisms of fermentation.

12. In apparatus for transforming organic matter into a form in which its nitrogen is available, the combination of an inner chamber for receiving the matter, an outer chamber surrounding the inner chamber and adapted to receive the completely fermented matter after it has been removed from the inner chamber and means for supplying air to the inner chamber from the outer chamber to maintain and propagate the micro-organisms of fermentation, said air being preheated by the effect of the heat of the fermented matter in the structure.

13. In apparatus for transforming organic matter into a form in which its nitrogen is available, the combination of a chamber within which the material may be subjected to fermentation, means for supplying air to the chamber to maintain and propagate the micro-organisms of fermentation and means spaced from the walls of the chamber for protecting the chamber and the air supplying means from the detrimental effect of changes in the external atmosphere.

14. In apparatus for transforming organic matter into a form in which its nitrogen is available, the combination of a chamber within which the material may be subjected to fermentation, a heat retaining enclosure for the chamber providing heat insulating spaces, means for supplying air to the chamber from the enclosure to maintain and propagate the micro-organisms of fermentation and means for removing the offensive constituents from the gaseous products of fermentation discharged from the chamber.

15. In apparatus for transforming organic matter into a form in which its nitrogen is available, the combination of a chamber within which the material may be subjected to fermentation, a heat retaining enclosure for the chamber, means for supplying air to the chamber from the enclosure to maintain and propagate the micro-organisms of fermentation, means for removing the offensive constituents from the gaseous products of fermentation discharged from the chamber and means for discharging the purified gases into the external atmosphere.

16. In apparatus for transforming organic matter into a form in which its nitrogen is available, the combination of a chamber within which the material may be subjected to fermentation, a heat retaining enclosure for the sides and top of the chamber, means for supplying air to the chamber from the enclosure to maintain and propagate the micro-organisms of fermentation and means for removing the offensive constituents from the gaseous products of fermentation discharged from the chamber.

17. In apparatus for transforming organic matter into a form in which its nitrogen is available, the combination of a chamber within which the matter may be subjected to fermentation, a building surrounding the exposed sides of the chamber for protecting the same from the external atmosphere and adapted to serve as a storage space for completely fermented material removed from the chamber, means for supplying air to the chamber from within the building to maintain and propagate the micro-organisms of fermentation and means for removing offensive constituents from the gaseous products of fermentation discharged from the chamber.

18. In apparatus for transforming organic matter into a form in which its nitrogen is available, the combination of a plurality of chambers provided with a common roof having doorways through which the matter may be supplied to the chambers for fermentation therein, each of said chambers being provided with a doorway in a side wall through which the completely fermented matter may be removed, a heat-retaining enclose above the roof and along the sides of the chambers and provided with doorways to permit vehicles to pass over the roof for conveying matter to the chambers and to pass along the sides of the chambers for conveying the fermented matter away after it has been removed from the chambers, means for supplying air to the chambers from the enclosure to permeate the matter in the chambers and maintain and propagate the micro-organisms of fermentation, means for removing the offensive constituents from the gaseous products of fermentation discharged from the chambers and means for discharging the purified gases into the air outside of the enclosure.

19. In apparatus for transforming organic matter into a form in which its nitrogen is available, the combination of a plurality of chambers provided with a common roof having doorways through which the matter may be supplied to the chambers for fermentation therein, each of said chambers being provided with a doorway in a side wall through which the completely fermented matter may be removed, a heat-retaining enclosure above the roof and along the sides of the chambers and provided with doorways to permit vehicles to pass over the roof for conveying matter to the chambers and to pass along the sides of the chambers for conveying the fermented matter away after it has been removed from the chambers, means for supplying air to the chambers from the enclosure to permeate the matter in the chambers and maintain and propagate the micro-organisms of fermentation, means for removing the offensive constituents from the gaseous products of fermentation discharged from the chambers, means for discharging the purified gases into the air outside of the enclosure, a conduit leading from each chamber for removing therefrom the liquid products of fermentation and means in communication with the conduits for collecting said products.

20. In apparatus for transforming organic matter into a form in which its nitrogen is available, the combination of a plurality of chambers provided with a common roof on which the matter may be deposited before being introduced into the chambers through doorways in the roof, means for removing from the roof liquids draining from the matter deposited thereon, a heat retaining enclosure above the roof and along the sides of the chambers and provided with doorways to permit vehicles to pass over the roof for conveying matter to the chambers, means for supplying air to the chambers from the enclosure to permeate the matter in the chambers and maintain and propagate the micro-organisms of fermentation, means for removing the offensive constituents from the gaseous products of fermentation discharged from the chambers and means for discharging the purified gases into the air outside of the enclosure.

In testimony whereof I affix my signature.

EDWARD PAYSON COOKE.